(12) United States Patent
Osecki

(10) Patent No.: US 9,993,074 B1
(45) Date of Patent: Jun. 12, 2018

(54) MODULAR HOME AND GARDEN KIT

(71) Applicant: Blake Osecki, West Bloomfield, MI (US)

(72) Inventor: Blake Osecki, West Bloomfield, MI (US)

(73) Assignee: Modular Home and Garden LLC, West Bloomfield, MI (US)

( * ) Notice: Subject to any disclaimer, the term of this patent is extended or adjusted under 35 U.S.C. 154(b) by 0 days. days.

(21) Appl. No.: 15/650,238

(22) Filed: Jul. 14, 2017

(51) Int. Cl.
| | |
|---|---|
| *E04C 2/38* | (2006.01) |
| *A47B 47/00* | (2006.01) |
| *E04H 17/16* | (2006.01) |
| *A47C 4/02* | (2006.01) |
| *B25H 1/00* | (2006.01) |
| *A01G 1/08* | (2006.01) |

(52) U.S. Cl.
CPC ............ *A47B 47/0083* (2013.01); *A01G 1/08* (2013.01); *A01G 9/28* (2018.02); *A47B 47/0091* (2013.01); *A47C 4/021* (2013.01); *B25H 1/00* (2013.01); *E04H 17/168* (2013.01)

(58) Field of Classification Search
CPC ......... E04H 17/168; A01G 1/08; A47C 4/021; A47B 47/0083; A47B 47/0091; B25H 1/00
See application file for complete search history.

(56) References Cited

U.S. PATENT DOCUMENTS

| | | | | |
|---|---|---|---|---|
| 1,898,297 | A * | 2/1933 | Fox ...................... | A63H 33/105 446/105 |
| 5,864,997 | A * | 2/1999 | Kelly ....................... | A01G 9/14 403/294 |
| 8,671,640 | B1 * | 3/2014 | Thomas .................... | E04B 2/18 446/122 |
| 2016/0069101 | A1 * | 3/2016 | Pooch ................... | E04H 17/168 256/31 |

* cited by examiner

*Primary Examiner* — Patrick J Maestri

(57) ABSTRACT

The versatile modular home and garden kit includes multiple platform pieces and a variety of support posts for use in connecting the platform pieces together to form the construction of an unlimited number of structural, storage, garden, or entertainment uses for the home and garden. The versatile modular home and garden kit pieces assemble without the use of tools or screws by easily sliding an end of a platform piece into one side of the support posts which makes use of a plurality of unique trapezoidal grooves.

5 Claims, 8 Drawing Sheets

MODULAR HOME AND GARDEN KIT

FIELD OF THE INVENTION

My disclosure relates generally to support posts and other components that can form a modular assembly, such as a garden bed or a shelving unit, and to a system featuring support posts each having multiple extrusions on each side that slide efficiently into a receiving module within each support post.

BACKGROUND

Nearly half of U.S. homeowners participated in creating some sort of home garden. The rising popularity of eco-friendly products and organic produce has created a growing millennial demographic interested in gardening and gardening methods. According to one study, gardening homeowners are 25% more likely to pay more for eco-friendly gardening products than non eco-friendly products. Applicant's disclosure contributes quality, sustainable gardening structures and structural accessories to this industry, making growing one's own produce and/or flowers as effortless as possible.

Demand for home organization products in the US is forecast to increase 3.5 percent per year through 2019 to $10.5 billion. Bins, baskets and totes will remain the largest product segment, while modular units will grow the fastest. Garages will be the fastest growing room in which organization products are used.

In the gardening and outdoor living market, plants, growing media and shrubs represent the leading market segment, at almost 58% of the overall market.

The do-it-yourself market has seen growth in recent years as consumers under pressure due to the economic crisis opt to carry out home improvements themselves rather than paying for professional home improvement help.

SUMMARY

My disclosure is directed to a support post and to modular home and garden kits including my support posts that satisfy the needs of do-it-yourself consumers. The kit embodiment of the present disclosure contains a plurality of components, including support posts and other components that are adapted to be used together through sliding and stacking motions. The kit embodiments of my disclosure can be assembled and used without the need for special tools, excessive strength, or assembly skills. These constructive solutions can be interchanged to yield many different product designs.

The components of the kit are constructed to be packed into a kit for at-home assembly. Different components, furthermore, can be packed to form an endless variety of kits for different purposes.

One kit, a raised garden kit, includes multiple planar longitudinal members with trapezoidal ends, corner support posts, square pegs for additional levels, and spike members to be used at the bottom of the support post. Another kit, the shelving assembly kit, includes corner support posts with square pegs, and a platform to be used as the shelf.

These and other objects, aspects, features and advantages of my disclosure will become apparent from the following detailed description of the preferred embodiments taken in conjunction with the accompanying drawings.

BRIEF DESCRIPTION OF THE DRAWINGS

My disclosure will be better understood from a reading of the following detailed description taken in conjunction with the drawings in which like reference designators are used to designate like elements, and in which.

DETAILED DESCRIPTION

Figure 1:
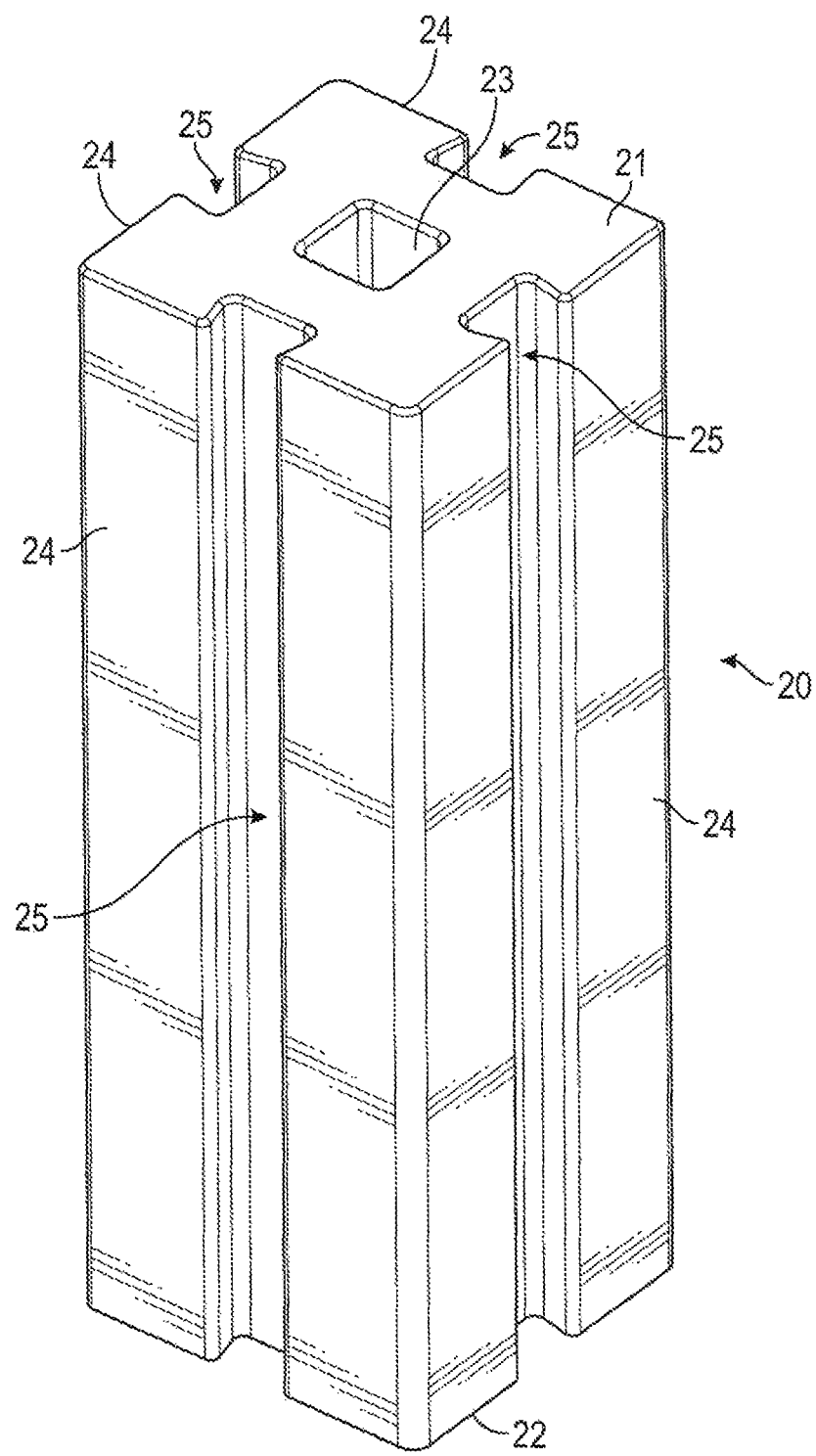
FIG. 1 is a perspective view of a support post of an embodiment of my invention.

While my invention is susceptible to embodiments in many different forms, there is shown in the drawings and herein described in detail, features, structures, or characteristics of my invention as demonstrated in various preferred embodiments. These embodiments are to be considered for illustrative purposes and as an exemplification of the principles of my/our invention and are not intended to limit the broad aspects of my/our invention to the specific embodiments illustrated herein. The features, structures, or characteristics of my/our invention as disclosed in any one preferred embodiment, for example, may be rearranged or combined with the features, structures or characteristics in any other embodiment. One skilled in the relevant art will also recognize that my/our invention may be practiced without one or more of the specific details, or with other methods, components, materials, and so forth. In other instances, well-known structures, materials, or operations are not shown or described in detail to avoid obscuring aspects of the invention.

My modular assembly embodiments provide consumers an effortless, sustainable product that utilizes a unique and modular geometry. No carpentry skills or fasteners are required to install or maintain my modular assembly. From raised bed gardens, storage and shelving systems, pet housing structures, children's play structures, and various other potential applications, embodiments of my invention are designed for the do-it-yourself consumer. My modular assembly kits are unique and provide significant improvements over prior products in their simplicity, and ease of use, while providing improved structural integrity, stability and support. My modular assembly kits will also be comprised of varying components depending on the end use or product desired by the consumer.

The various components found in my modular assembly kits can be made of PVC decking, wood/polymer, steel, or any other suitable material.

FIG. 1 shows a support post 20 that, although capable of being made in various forms and with varying sides, is the cornerstone and a common component of my modular assembly kit embodiments. As shown in the embodiment portrayed in FIG. 1, this support post is elongated with a first end 21 and a second end 22. On each end there is located a square shaped aperture 23. This aperture is configured to receive a similarly square shaped extension or stacking post as described herein below. It will be appreciated by those skilled in the art that although the aperture 23 is shown and described as "square shaped," it can be of any shape as long as the stacking posts or other components it is designed to receive are of a similar shape.

Figure 2:
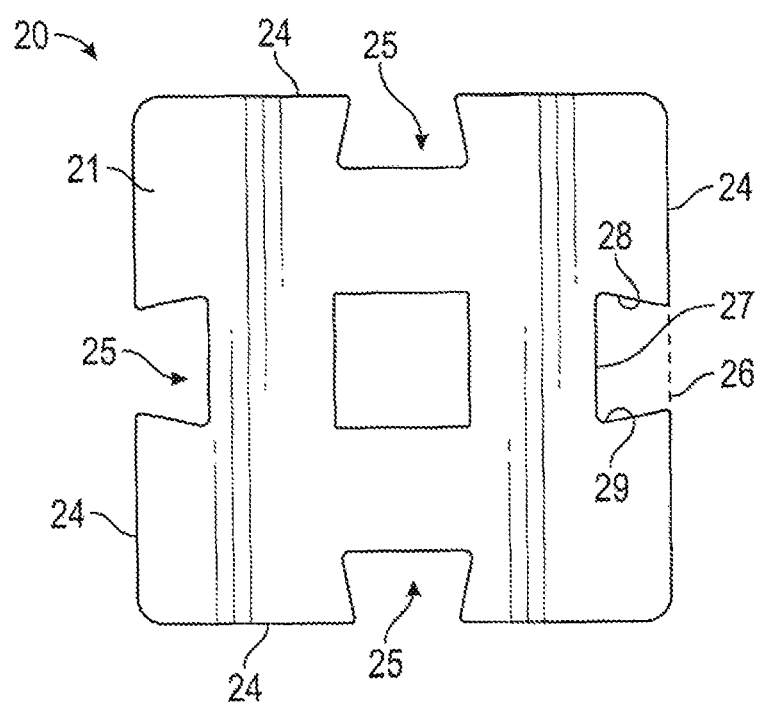
FIG. 2 is a top view of the support post of FIG. 1.

Between the first end 21 and the second end 22 there are four sides, each designated with reference number 24. Although the embodiment shown in FIG. 1 shows the support post with four sides, it is recognized that any number of sides of three or more can be used in embodiments of this disclosure. Within each side there is a trapezoidal groove 25, each groove 25 extending from the first end 21 to the second end 22 of the support post 20. The trapezoidal shape of each groove 25 is best shown in FIG. 2, FIG. 2 being a top view of the support post 20 and of the first end 21. As shown therein, the trapezoidal groove has an outermost side 26 aligned with the side 24 of the support post, an innermost side 27 in parallel with the outmost side 26, and two nonparallel sides 28 and 29. Significantly, the length of the innermost side 27 of the trapezoidal groove 25 is longer than the length of the outermost side 26 of the trapezoidal groove 25. In this manner, components that are slid into and along the trapezoidal groove 25 as herein described below will be securely held in place.

Figure 3:
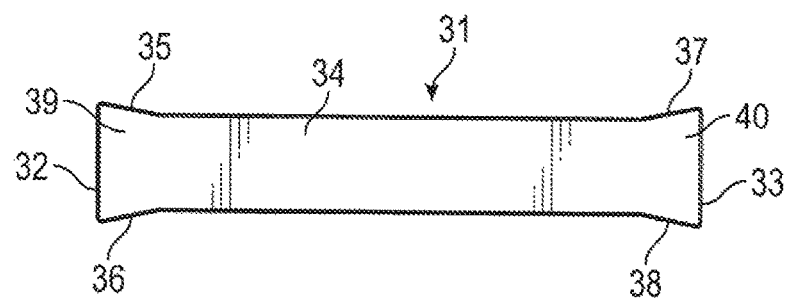
FIG. 3 is a top view of the longitudinal panel in accordance with an embodiment of my invention.

FIG. 3 shows the top of a longitudinal panel 31 used in an embodiment of my invention, which longitudinal panel extends and is connected between two support posts 20. The longitudinal panels 31 can be used as a front, rear or side wall of various final products, such as for flower beds, shelving units, work benches and the like as described below. Longitudinal panels can be provided with various widths and heights depending upon the desired size of the final product. The longitudinal panel has a first longitudinal end 32 and a second longitudinal end 33, with a center section 34 therebetween. The length of each longitudinal end 32 and 33 is approximately, but slightly less than, the length of the innermost side 27 of the trapezoidal groove 25. The thickness of the center section 34 of the longitudinal panel 31 is less than the length of each longitudinal end 32 and 33 and is less than the length of the outermost side 26 of the trapezoidal groove 25. As also shown in the top view of the longitudinal panel 31 in FIG. 3, there are tapered sides 35 and 36 between first longitudinal end 32 of longitudinal panel 31 and the the center section 34 of longitudinal panel 31. There are also tapered sides 37 and 38 between the second longitudinal end 33 and the center section 34 of the longitudinal panel 31. The tapered sides 35 and 36, as well as 37 and 38, are of the same angle as the nonparallel sides 28 and 29 of the trapezoidal grooves 25. In this manner, the sides 35 and 36 and the sides 37 and 38, with ends 32 and 33, respectively, form trapezoidal shaped sections 39 and 40 that are configured to fit within a trapezoidal groove 25 and allow the ends of the longitudinal panels to mate and securely attach to support post 20.

Figure 4:
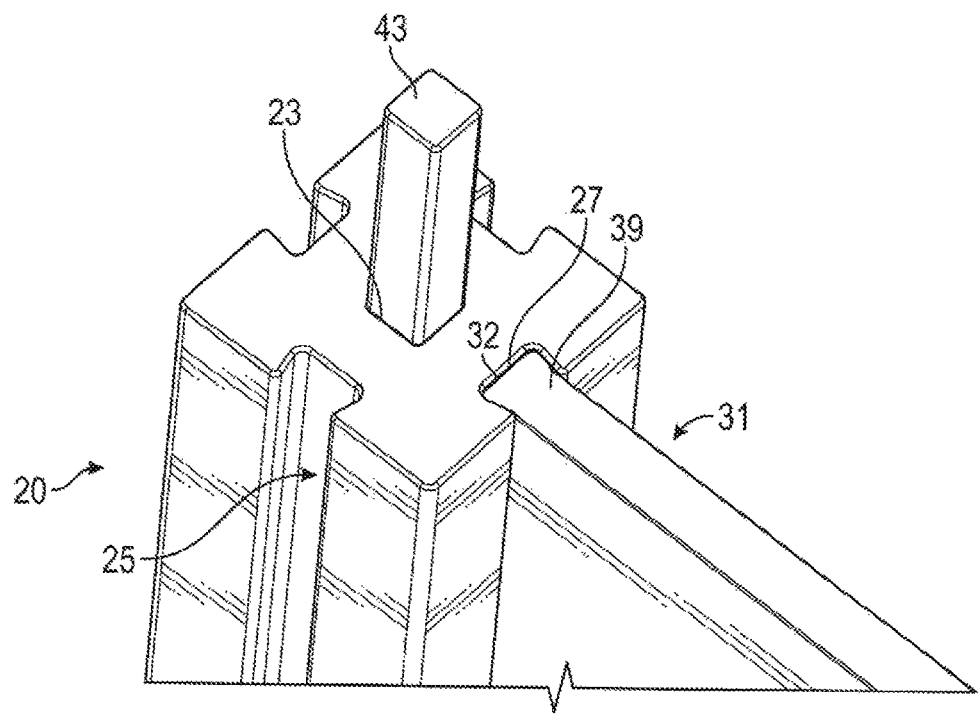
FIG. 4 is a perspective view showing a longitudinal panel assembled to a support post in an embodiment of my invention.
Figure 5:
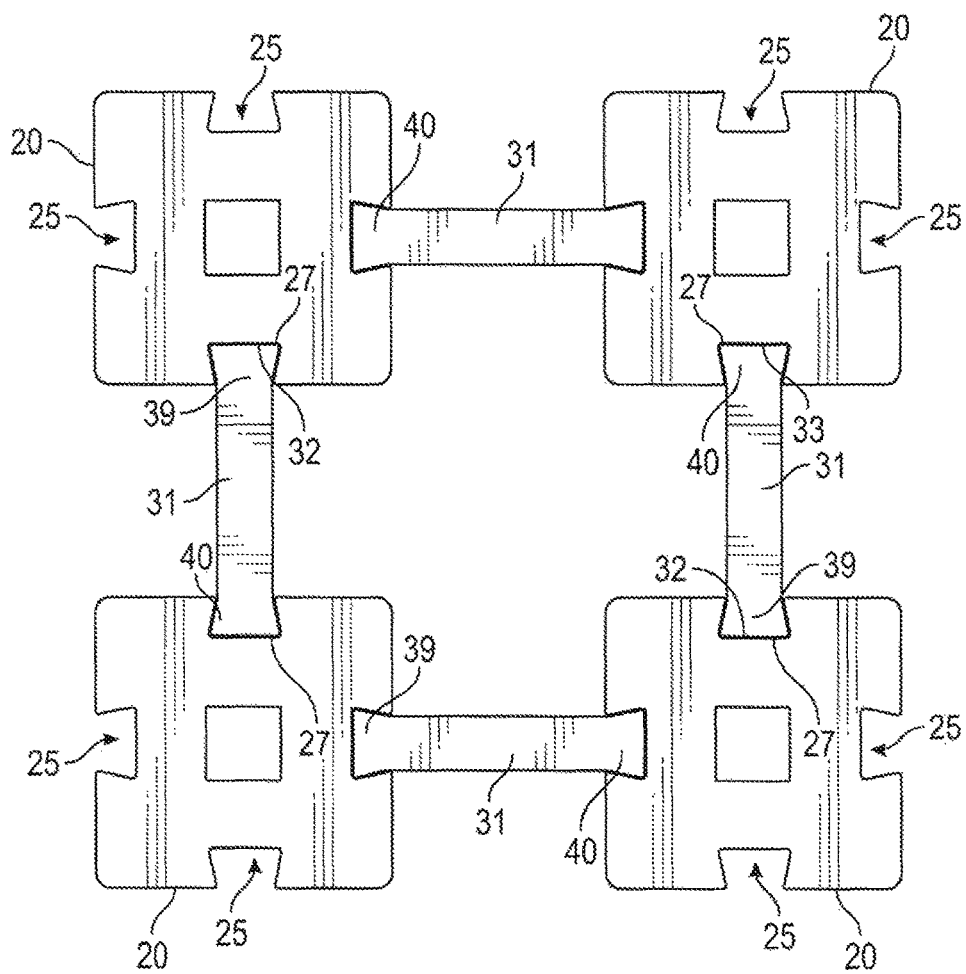
FIG. 5 is a top view showing four (4) support posts assembled with four (4) longitudinal panels in an embodiment of my invention.

FIGS. 4 and 5 illustrate the mating and attachment of longitudinal panels 31 to support posts 20. As shown in the perspective view of FIG. 4, the trapezoidal shaped section 39 of longitudinal panel 31 has been slid and fit within the trapezoidal groove 25 of support post 20. In doing so, the first longitudinal end 32 of longitudinal panel 31 matches and is positioned at the innermost side 27 of trapezoidal groove 25. Also shown in FIG. 4 is a removable stacking post 43 that fits within the central aperture 23 of support post 20. The stacking post is used when support posts are stacked on top of each other and will keep the vertical arrangement secure and in alignment.

FIG. 5 illustrates a top view of an assembly of four support posts 20 and four longitudinal panels 31 such as might be used in assembling a square flower bed kit. Similar to the perspective view of FIG. 4, the top view of FIG. 5 shows the trapezoidal shaped sections 39 of a longitudinal panel 31 fit within the trapezoidal groove 25 of support posts 20. In this manner, the first longitudinal end 32 of a longitudinal panel 31 matches and is positioned at the innermost side 27 of a trapezoidal groove 25 of one support post 20. In addition, there is shown the trapezoidal shaped section 40 of a longitudinal panel 31 fit within the trapezoidal groove 25 of supports posts 20, whereby the second longitudinal end 33 of a longitudinal panel 31 matches and is positioned at the innermost side 27 of a trapezoidal groove 25 of a support post 20.

Figure 6:
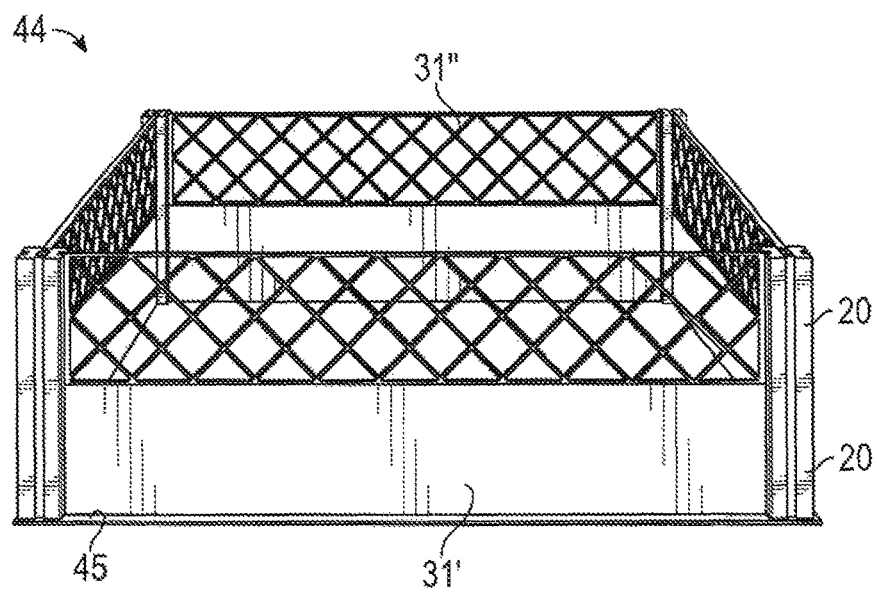
FIG. 6 is a perspective view of an assembled flower bed kit embodiment of my invention.

FIG. 6 illustrates a flower bed embodiment 44 of my disclosure such as assembled in accordance with the top view of FIG. 5. In this embodiment, each corner is made with two support posts 20, one stacked on top of the other using a square stacking post (not shown) to maintain the posts in proper vertical alignment. Each side of the flower bed embodiment 44 is made up of two longitudinal panels, a solid longitudinal panel 31' on the bottom and a latticed longitudinal panel 31" on top. Below the bottom support posts 20 and the bottom longitudinal panels 31' there is a horizontal panel 45 as the floor of the flower bed embodiment 44.

Figure 7:
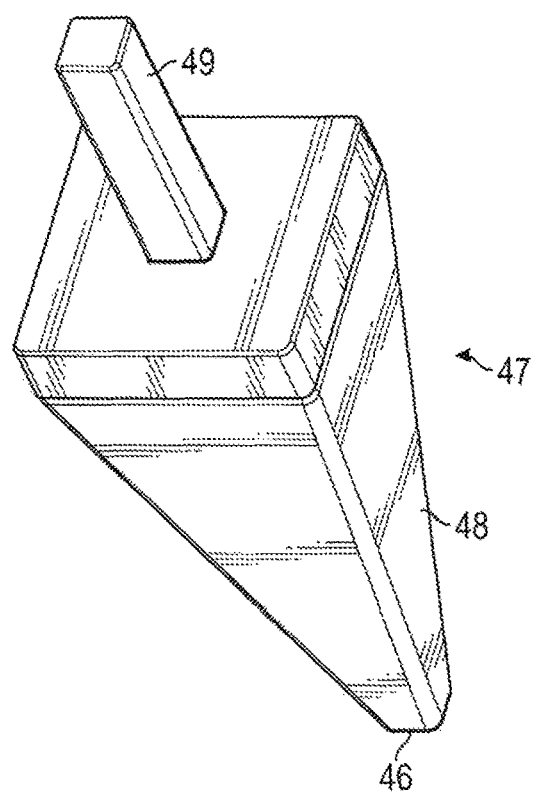
FIG. 7 is a perspective view of a stake extension in an embodiment of my invention.

FIG. 7 illustrates a stake extension 47 that can be assembled beneath a support post 20 providing a raised assembly. In particular, on top of the stake extension 47 there is a stake extension stacking post 49, which is shaped and adapted to be inserted within a central aperture 23 located at the bottom of a support post 20, keeping the support post and stake extension in alignment. Although the stake extension stacking post 49 can be a fixed part of stake extension 47, it can also be a removable stacking post 43 with a central aperture formed on top of the stake extension 47. Either configuration will keep the stake extension 47 in vertical alignment with a support post 20. The stake extension 47 embodiment shown in FIG. 7 has tapered sides 48 down to a smaller sized portion of stake extension 46. It will be appreciated by those skilled in the art that while the stake extension 47 shown in FIG. 7 is with tapered sides 48, many other configurations are possible.

Figure 8:
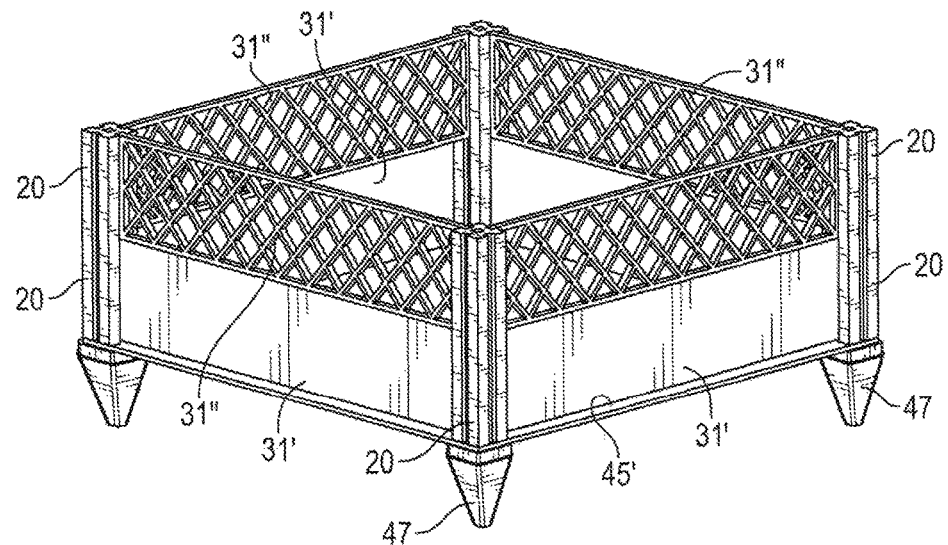
FIG. 8 is a perspective view of an assembled raised flower bed kit with stake extensions embodiment of my invention.

FIG. 8 illustrates the flower bed embodiment of FIG. 6 but railed off the ground by stake extensions 47. In this embodiment, stake extension stacking post 49 (not shown) is assembled through a square hole (not shown) in the horizontal panel 45 and then through the central aperture 23 (not shown) in the bottom of the lower support posts 20.

Figure 9:
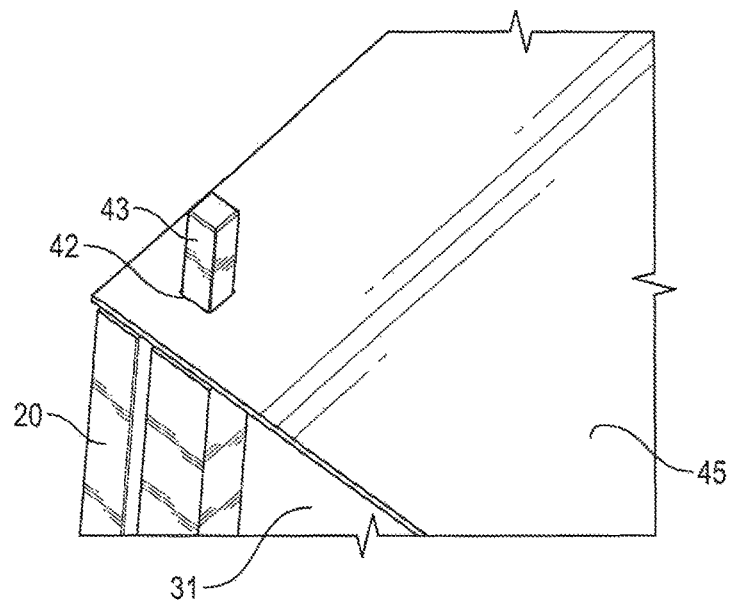
FIG. 9 is a perspective view showing a bottom panel assembled on a support post and longitudinal panel and secured over a stacking post in an embodiment of my invention.
Figure 10:
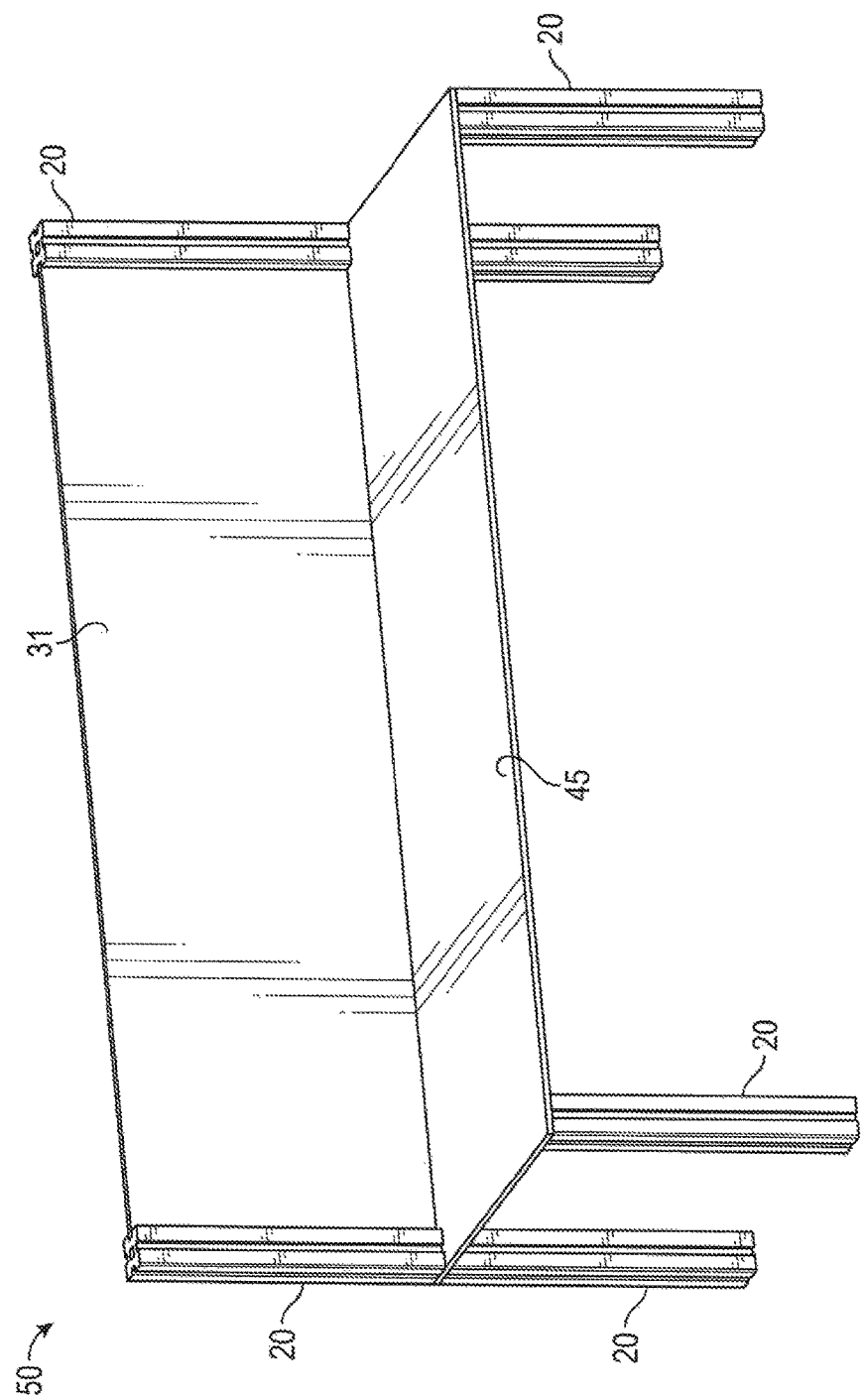
FIG. 10 is a perspective view of an assembled work bench kit embodiment of my invention.
Figure 11:
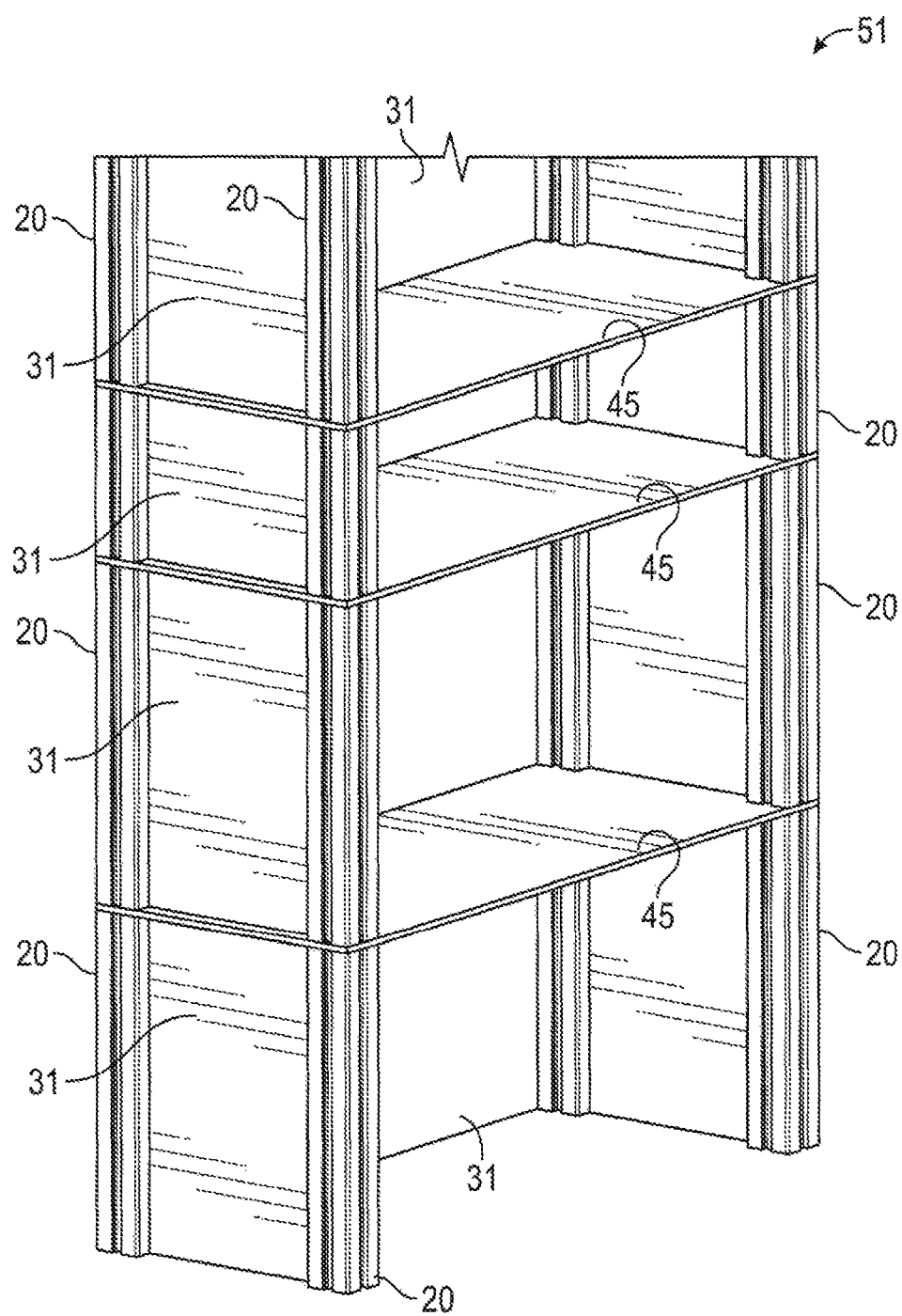
FIG. 11 is a perspective view of an assembled shelving kit embodiment of my invention.

FIG. 9 illustrates securing a horizontal panel 45, such as referenced above for the raised flower bed embodiment or for what might be used in a work bench embodiment 50 in FIG. 10 or a shelving embodiment 51 in FIG. 11, secured above a support post 20 (or what could be above a stake extension 47). In particular, a square hole 42 is placed in the horizontal panel 45, through which a square stacking post 43 (or square stake extension stacking post 49 if above a stake extension 47) is inserted. The lower end of stacking post 43 is inserted in the central aperture 23 (not shown) on top of the support post 20 shown in FIG. 9, and the exposed end of stacking post 43 shown in FIG. 9 can be inserted in the central aperture in the bottom of another stacking post 20. While the hole 42 in horizontal panel 45 has been shown and described herein as having a square cross-section, it will be appreciated by those skilled in the art that any configuration can be used as long as it matches the cross-sectional configuration of the stacking post 43.

FIG. 10 illustrates a work bench embodiment 50 of my disclosure. As shown therein, the work bench is assembled using support posts 20 for legs, a horizontal panel 45 for the work bench surface, and a longitudinal panel 31 for the back of the work bench area. The longitudinal panel 31 can be made of peg board material, for example, in order to facilitate hanging of tools and the like. The longitudinal panel 31 is secured by being inserted through trapezoidal grooves in support posts 20, and the horizontal panel 45 is secured with square holes 42 in the panel 45 and square stacking posts 43 in the manner shown in FIG. 9.

FIG. 11 illustrates a shelving unit embodiment 51 of my disclosure. As shown therein, the shelving unit is assembled using support posts 20 at each vertical corner supporting horizontal panels 45 and longitudinal back and side panels 31. The longitudinal panels 31 are secured by being inserted through trapezoidal grooves in support posts 20, and the horizontal panels 45 are secured with square holes 42 in the panels 45 and square stacking posts 43 in the manner shown in FIG. 9.

My versatile modular home and garden kit will enable consumers to grow, build, store, work, and play, providing high quality home and garden solutions. It is unique in that consumers will be able to completely customize how they use the individual components While the preferred embodiments of the present invention have been illustrated in detail, it should be apparent that modifications and adaptations to those embodiments may occur to one skilled in the art without departing from the scope of my disclosure.

I claim:

1. A modular assembly kit, comprising at least three support posts having a first end and a second end, and comprising N sides wherein N is 3 or greater, wherein each side is formed to include a trapezoidal-shaped groove extending from said first end to said second end, each of said trapezoidal grooves having an outermost side along a side of said support post and an innermost side wherein said trapezoidal groove innermost side is longer than said trapezoidal groove outermost side;

one or more longitudinal panels having a first end and a second end and a center section therebetween having a front and back surface, wherein said center section is flared from said front and back surfaces to form a first trapezoidal shaped section disposed on said first end of each longitudinal panel, and said center section is flared out from said front and back surfaces to form a second trapezoidal shaped section disposed on said second end of each longitudinal panel, and wherein said trapezoidal-shaped groove is configured to slideably and removably receive a trapezoidal-shaped section of said longitudinal panel such that the first trapezoidal shaped section of a longitudinal panel can be slideably received within one support post and the second trapezoidal shaped section of the same longitudinal panel can be slideably received within another support post.

2. The modular assembly kit of claim 1 wherein each of said support posts includes a rectangle shaped central aperture in at least one of said first end or said second end and a stacking post configured to be received within said central apertures of two support posts where said support posts can be joined.

3. The modular assembly kit of claim 2 wherein said rectangle shaped central aperture is rounded at the vertex of each angle of the rectangle shape.

4. The modular assembly kit of claim 3 wherein each of said trapezoid-shaped grooves has two non-parallel sides between the respective ends of said innermost side and said outermost side forming an angle between each non-parallel side and said innermost side, wherein each angle is less than 90 degrees and each of said trapezoid-shaped grooves is rounded at the vertex of said angles.

5. The modular assembly kit of claim 1 wherein each of said trapezoid-shaped grooves has two non-parallel sides between the respective ends of said innermost side and said outermost side forming an angle between each non-parallel side and said innermost side, wherein each angle is less than 90 degrees and each of said trapezoid-shaped grooves is rounded at the vertex of said angles.

* * * * *